United States Patent [19]

Okada

[11] Patent Number: 4,891,943
[45] Date of Patent: Jan. 9, 1990

[54] AXLE DRIVING APPARATUS

[75] Inventor: Hideaki Okada, Takarazuka, Japan

[73] Assignee: Kanzaki Kokyukoki Mfg. Co. Ltd., Japan

[21] Appl. No.: 304,590

[22] Filed: Feb. 1, 1989

[30] Foreign Application Priority Data

Feb. 3, 1988 [JP] Japan .................................. 63-24194

[51] Int. Cl.⁴ ............................................ F16D 39/00
[52] U.S. Cl. ........................................ 60/464; 60/487; 60/494; 91/505; 180/53.4; 180/307
[58] Field of Search ................. 60/464, 494, 487, 453, 60/454, 484, 485; 91/505; 180/305, 307, 53.1, 53.4

[56] References Cited

U.S. PATENT DOCUMENTS

| | | |
|---|---|---|
| 2,220,636 | 11/1940 | Bischof .................................... 60/487 |
| 2,945,382 | 7/1960 | Ritter et al. .................... 180/53.4 X |
| 3,430,438 | 3/1969 | Weiss . | 
| 3,687,212 | 8/1972 | Forster . |
| 3,903,698 | 9/1975 | Gellotly et al. ................... 60/464 X |
| 3,944,010 | 3/1976 | Winter et al. . |
| 4,324,275 | 4/1982 | Ward .................................. 60/494 X |
| 4,627,237 | 12/1986 | Hutson . |
| 4,781,259 | 11/1988 | Yamaota et al. ................ 180/305 X |

FOREIGN PATENT DOCUMENTS 3239223 10/1982 Fed. Rep. of Germany .

*Primary Examiner*—Edward K. Look
*Attorney, Agent, or Firm*—Saidman, Sterne, Kessler & Goldstein

[57] ABSTRACT

An axle driving apparatus which houses within a casing thereof a hydraulic motor and a hydraulic pump constituting a hydro-static-transmission, provides in the wall of the lower half casing oil passages connecting the hydraulic motor and hydraulic pump, integrally forms a pump mounting surface at the horizontal wall at the lower half casing, and integrally forms a motor mounting surface at the vertical wall of the same, so that the oil passages in the vertical wall are turned vertically, thereby substituting for turning of the rotation direction by the conventional bevel gear.

7 Claims, 5 Drawing Sheets

FIG·1

FIG·5
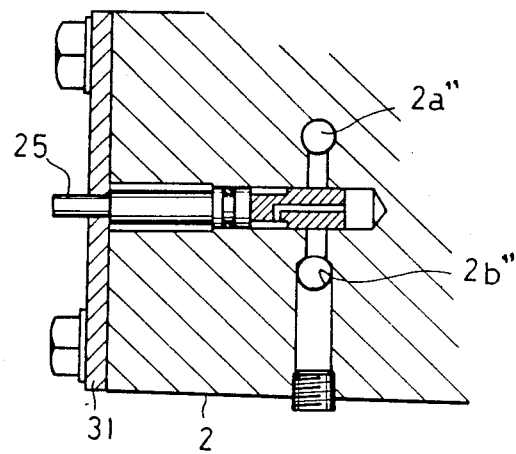
FIG·4
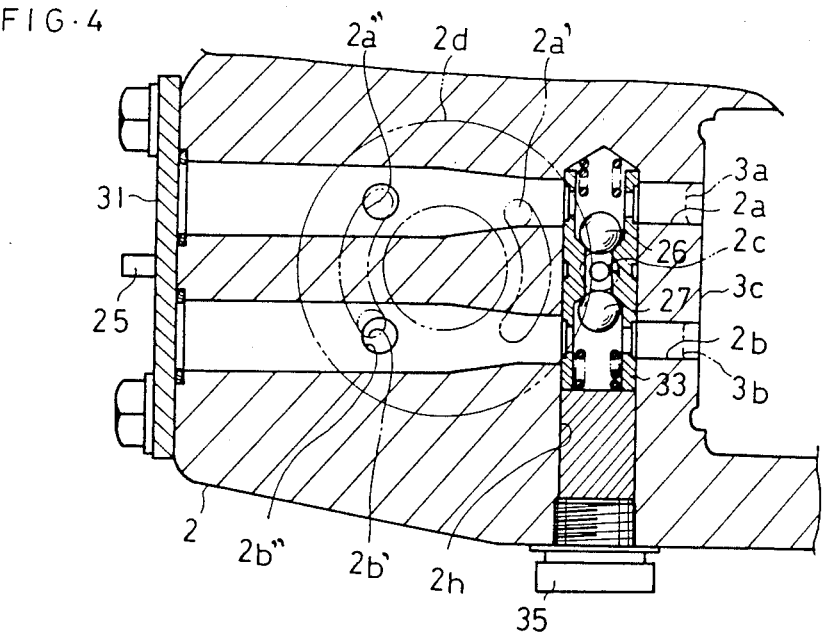

FIG·6
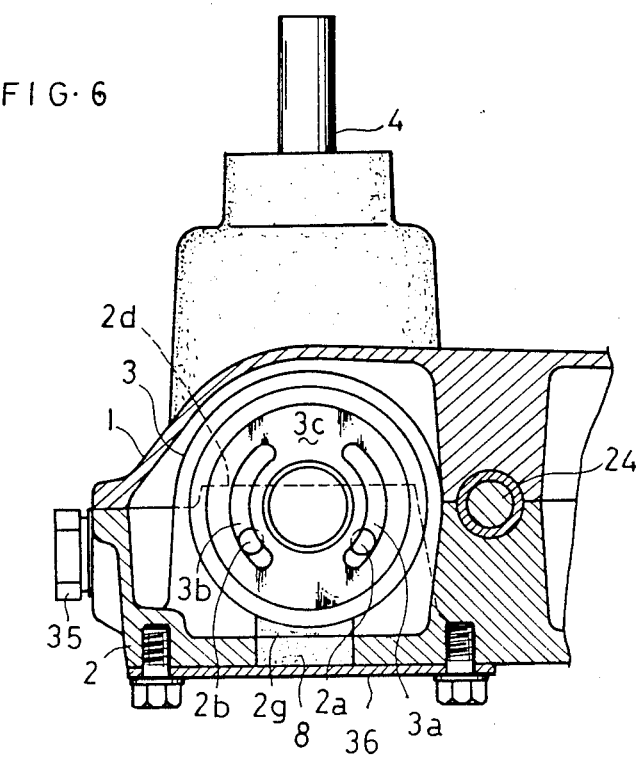
FIG·7
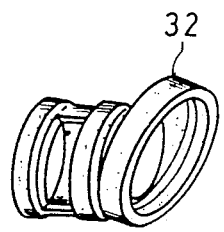

4,891,943

AXLE DRIVING APPARATUS

FIELD OF THE INVENTION

The present invention relates to an axle driving apparatus with a hydro-static-transmission used as a propulsion apparatus for a light tractor.

Description of the Prior Art

An axle driving apparatus has hitherto been well known which vertically divides a casing thereof to journal axles on the divided surfaces and attaches the axles to a transmission casing. Such axle driving apparatus is disclosed in, for example, the Japanese Utility Model Publication Gazette No. Sho 62-44198 and the Japanese Patent Laid-Open Gazette No. Sho 62-101945 filed by the same applicant.

In the prior art, however, a hydro-static-transmission separate from the axle driving apparatus is exposed at the outside thereof, whereby the axle driving apparatus is large-sized as a whole and larger in the gross weight. Also, in order to drive horizontal axles by a motor shaft of a hydraulic motor disposed vertically outside the appartus, bevel gears must be interposed in both the drive systems.

Furthermore, there is inconvenience such that a reserve tank for compensating a decrease in operating oil in the hydro-static-transmission is required or a particular pipe or oil passage for connecting a driving casing and the hydro-static-transmission is required to use lubricating oil in the driving casing as the operating oil.

SUMMARY OF THE INVENTION

An object of the invention is to provide an axle driving apparatus which is so constructed that a hydraulic motor and a hydraulic pump constituting the hydrostatic transmission are tight enclosed in a transmission casing comprising two vertically divided half casings jointed with each other, an oil passage connecting the hydraulic motor and hydraulic pump is formed at the wall of a lower half casing, and the pump mounting surface and motor mounting surface are integrally formed at the horizontal wall and the vertical wall of the lower half casing, so that the oil passage in the walls is turned at a right angle so as to substitute for a change in the rotation direction by use of conventional bevel gears.

The above and further objects and novel features of the invention will more fully appear from the following detailed description when the same is read in connection with the accompanying drawings.

BRIEF DESCRIPTION OF THE DRAWINGS

FIG. 4 is a sectional view taken on the line I—I in FIG. 2, FIG. 5 is a sectional view taken on the line II—II in FIG. 2, and FIG. 6 is a sectional view taken on the line III—III in FIG. 3.

FIG. 7 is a cross-eyed view of a bearing cylinder.

DESCRIPTION OF THE PREFERRED EMBODIMENT

Next, explanation will be given on an embodiment shown in the accompanying drawings.

Figure 1:
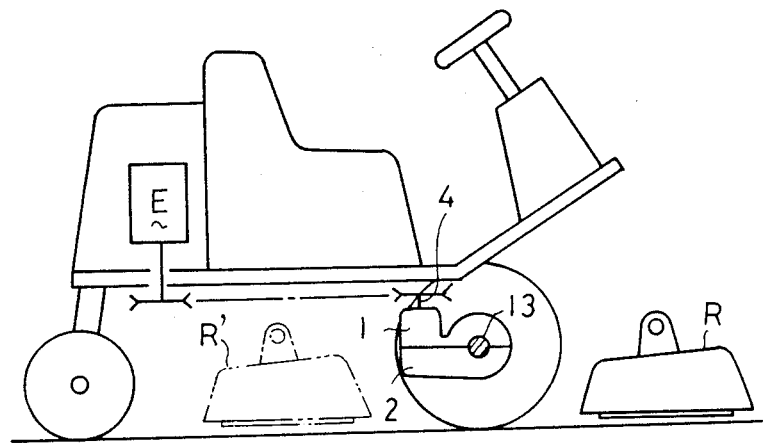
FIG. 1 is a side view of a tractor provided with an axle driving apparatus of the invention.

In FIG. 1, a light tractor loading thereon an engine E of a vertical crank shaft is shown.

A pulley is fixed to the vertical crank shaft of the engine E so that a driving power is transmitted through a belt to a pulley fixed to a pump shaft 4 at a hydraulic pump P.

The light tractor is provided in front or under the body with rotary mowers R and R' for carrying out mowing of a lawn.

The axle driving apparatus of the invention drives axles 13 of the above-mentioned tractor.

Figure 2:
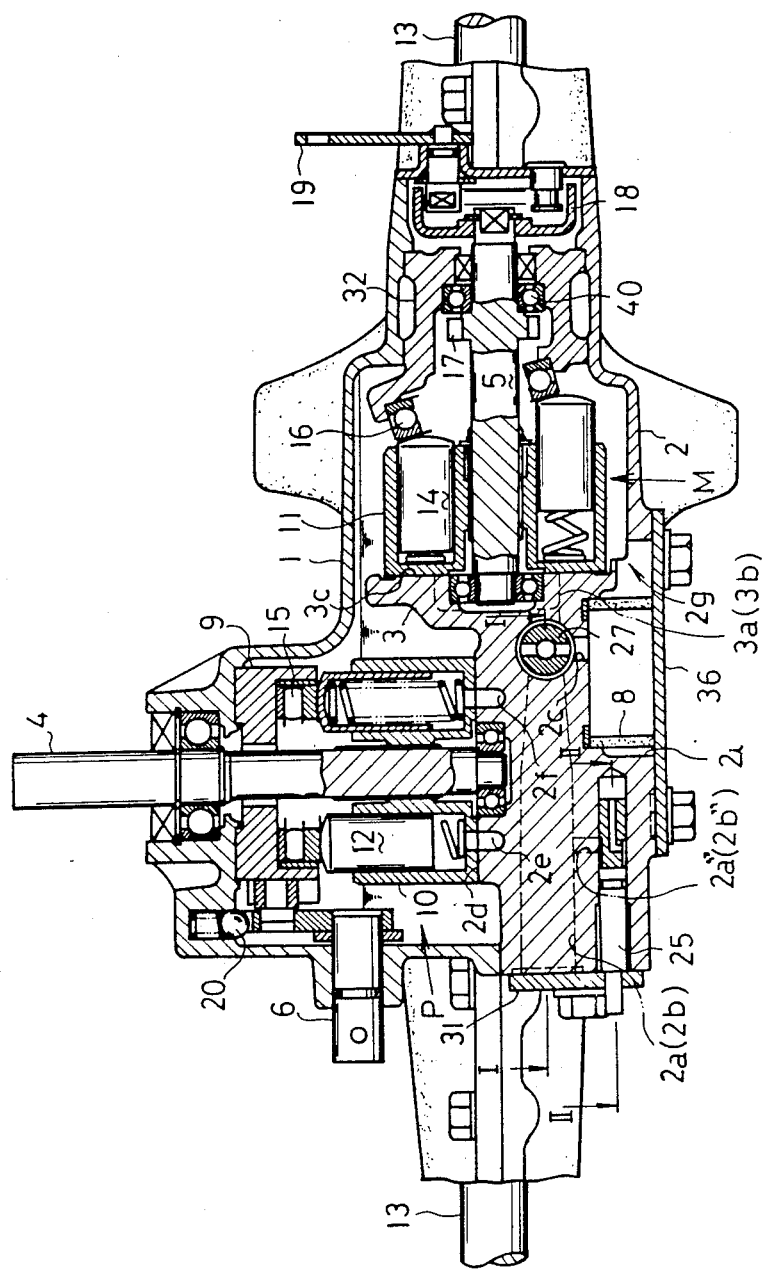
FIG. 2 is a sectional front view thereof.
Figure 3:
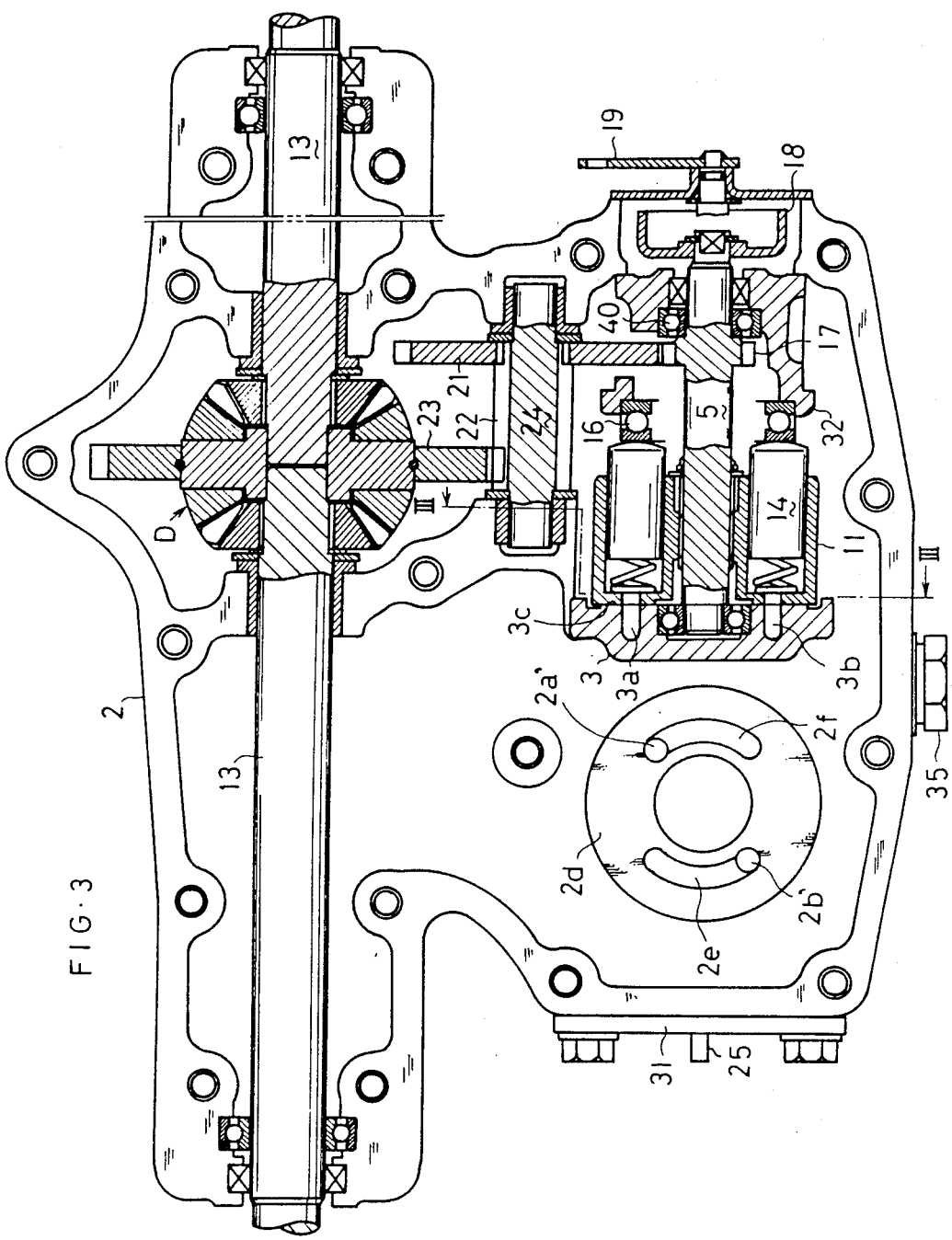
FIG. 3 is a plan view of the same, from which an upper half casing is removed.

The axle driving apparatus will be detailed of its construction in FIGS. 2, 3 and 4.

A transmission casing at the axle driving apparatus is divided into an upper half casing 1 and a lower half casing 2, both the half casings 1 and 2 being joined to form one tight enclosed transmission casing.

The axles 13, a counter shaft 24, and a bearing cylinder 32 for a motor shaft 5, are held between the butt joint surfaces of the upper and lower half casings 1 and 2.

In the bearing cylinder 32 is fitted a bearing 40 for journalling the projection of motor shaft 5.

The lower half casing 2 is larger in thickness at part of the bottom wall thereof, and an oil passage to be discussed below is bored at the part larger in thickness.

A pump mounting surface $2d$ is formed at the inner surface of the part larger in thickness and a motor mounting surface $3c$ is formed at the side surface of a rising portion 3 adjacent and vertical to the right side of the part of large thickness.

Within the larger thickness part of the lower half casing 2 are provided oil passages $2a$ and $2b$ directly communicating with a pair of crescent-shaped oil passages $3a$ and $3b$ at the motor mounting surface $3c$.

The oil passages $2a$ and $2b$ can be molded by die casting and closed at the openings by a lid 31.

The oil passages $2a$ and $2b$ are gradually tapered to be easy to extract due to the die casting.

The pump mounting surface $2d$ is disposed above intermediate portions of the oil passages $2a$ and $2b$. Oil passages $2a'$ and $2b'$ communicating with a pair of crescent-shaped oil passages $2e$ and $2f$ at the pump mounting surface $2d$ are bored downwardly to connect with the oil passages $2a$ and $2b$ to thereby form a closed circuit connecting the hydraulic pump P and hydraulic motor M.

A short-circuit valve 25 for making the hydraulic motor M freely rotatable when in traction of a vehicle loading the axle driving apparatus of the invention is formed in the part of larger thickness at the bottom wall of lower half casing 2.

In other words, oil passages $2a''$ and $2b''$ communicating with the oil passages $2a$ and $2b$ are formed downwardly and the short-circuit valve 25 is provided therebetween and enters rightwardly from the state shown in FIG. 5, thereby short-circuiting between the oil passages $2a$ and $2b$.

Also, an oil passage $2h$ connecting the oil passages $2a$ and $2b$ is formed to contain in the oil passage $2h$ check valves 26 and 27 and an operating oil suction port $2c$, and an operating oil supply valve 33 for supplying the operating oil when decreased in the closed circuit is provided.

Reference numeral 35 designates a blind lid to fix the operating oil supply valve 33 in the oil passage 2h.

Below the operating oil suction port 2c for taking in lubricating oil in the casing as the operating oil is downwardly open a space 2i for collecting oil and an oil filter 8 is fitted in the space 2i, the oil filter 8 being supported detachably to the lower half casing 2 by a lid 36, thereby closing the space 2i.

An opening 2g for flowing therethrough lubricating oil into the space 2i is bored to communicate from the bottom wall at the lower half casing 2 into the casing.

The pump mounting surface 2d is horizontal and the motor mounting surface is vertical, which are perpendicular to each other, and a pump shaft 4 of hydraulic motor M projects upwardly, the motor shaft 5 of hydraulic motor M projecting horizontally.

On the pump mounting surface 2d is rotatably mounted a cylinder block 10 at the hydraulic pump P, and in a plurality of piston holes formed at the cylinder block 10 are inserted pistons 12 in relation to being axially slidable.

A thrust bearing 15 abutting against the upper ends of the pistons 12 is changed in an angle by a swash plate 9, whereby a discharge mass flow and the discharge direction of the hydraulic pump P are changed so that the discharged oil is delivered to the hydraulic motor M from the crescent-shaped oil passages 2e and 2f through the oil passages 2a' and 2b' and 2a and 2b.

The swash plate 9 is made variable of its angle in association with rotation of a speed change lever shaft 6, the speed change lever shaft 6 being provided with a detent unit 20 by which the lever shaft 6 can hold its neutral position.

A cylinder block 11 is rotatably mounted on the motor mounting surface 3c at the lower half casing 2, and in a plurality of cylinder holes formed at the cylinder block 11 are fitted pistons 14 axially slidably, so that a thrust bearing 16 constituting a fixed swash plate always abuts against the heads of pistons 14.

When pressure oil from the oil passages 2a and 2b urges the pistons 14 through the crescent-shaped oil passages 3a and 3b, the pistons 14 rotate along the bearing 16, and also the cylinder block 11 and motor shaft 5 rotate.

A gear 17 is provided on the motor shaft 5 and engages with a gear 21 at the counter shaft 24.

A pinion 22 on the counter shaft 24 engages with a ring gear 23 at differential gear unit D, so that the axles 13 are driven by differential rotation given from the differential gear unit D.

At the fore end of motor shaft 5 is fixed a brake drum 18 so that brake shoes are expanded by a brake lever 19 to contact with the brake drum 18, thereby exerting the braking action.

When the motor mounting surface 3c at the lower half casing 2 is processed, in order to facilitate insertion of a working tool, a bearing 40 is fitted in a bearing cylinder 32 in the transmission casing without providing directly at the lower half casing 2 a support for a bearing 40 supporting the projecting end of motor shaft 5, thereby enlarging a diameter of a half support at the lower half casing 2 to be larger.

At the bearing cylinder 32 is provided a holder for the thrust bearing 16.

The present invention constructed as above-mentioned has the effect as follows:

The hydraulic pump and hydraulic motor are tight enclosed in the transmission casing of the upper and lower half casings 1 and 2 and the surfaces, on which the hydraulic pump and motor are fixed, are made horizontal and vertical at the bottom of lower half casing 2 respectively, so that the hydro-static-transmission, which is conventionally attached to the outer surface of transmission casing, can reasonably and compactly be disposed therein, thereby enabling the axle driving apparatus to be small-sized and light weight.

The bearing 40 for the motor shaft 5 is not direclty sandwiched between the upper half casing 1 and the lower half casing 2, but provided in the bearing cylinder 32 sandwiched between the upper and lower half casings 1 and 2, whereby the sandwiching portion of the bearing 40 is made larger in diameter, thus facilitating insertion of a working tool.

The thrust bearing 16 is held by the bearing cylinder 32, whereby a particular support to the thrust bearing 16 is not required, thereby simplifying processing of the casing because the support for the thrust bearing 16 is used also as that for the bearing 40.

Since the oil passages 2a and 2b connecting the crescent-shaped oil passages at the hydraulic pump P and crescent-shaped oil passages 3a and 3b are bored in the lower half casing 2, a separate member is not required for forming the oil passages and the oil passages 2a and 2b can open simultaneously with when the lower half casing 2 is molded by die casting, whereby there is no need of perforating new oil passages.

Since the short-circuit valve 25 communicating with the oil passages 2a and 2b are provided, when the tractor is hauled, the hydraulic motor is freely rotatable.

Also, the short-circuit valve 25 is directly provided at the lower half casing 2, whereby the control can project from the side surface of the lower half casing 2.

The check valves 26 and 27 communicating with the oil passages 2a and 2b are provided and the opening 2g takes therein lubricating oil in the transmission casing so as to enable supply of operating oil for the hydro-static-transmission, whereby there is no need of disposing the operating oil and piping outside the transmission casing.

The space 2i containing therein the oil filter 8 is open at the lower surface of the lower half casing 2, whereby the oil filter 8 can detachably be tight enclosed in the transmission casing and the oil filter 8 is easy to inspect or exchange.

While a preferred embodiment of the invention has been described using specific terms, such description is for illustrative purpose only, and it is to be understood that changes and variations may be made without departing from the spirit or scope of the following claims.

What is claimed is:

1. An axle driving apparatus which journals axles between an upper half casing and a lower half casing vertically divided and disposes a hydraulic pump connected in association with an engine and a hydraulic motor driven by oil pressure from said hydraulic pump and driving said axles within a casing formed by joining said upper half casing and lower half casing, characterized in that the pump mounting surface for said hydraulic pump is formed horizontally on the inner surface at the bottom of said lower half casing, the motor mounting surface for said hydraulic motor is formed on the side surface of a rising erected adjacently and perpendicularly to said pump mounting surface, and a pump shaft of said hyraulic pump is disposed vertically to said axles and a motor shaft of said hydraulic motor is disposed in parallel to said axles.

2. An axle driving apparatus according to claim 1, characterized in that a bearing for supporting said motor shaft of said hydraulic motor is supported by a bearing cylinder, said bearing cylinder being held not-rotatably between said upper and lower half casings.

3. An axle driving apparatus according to claim 2, characterized in that at said bearing cylinder is held a thrust bearing abutting against the heads of pistons fitted into a cylinder block of said hydraulic motor.

4. An axle driving apparatus according to claim 1, characterized in that two oil passages which connect pairs of crescent-shaped oil passages formed at said pump mounting surface and motor mounting surface with each other, are disposed within the bottom wall of said lower half casing and extending horizontally in parallel relationship to each other, thereby forming a closed circuit.

5. An axle driving apparatus according to claim 4, characterized in that a short-circuit valve for short-circuiting said two oil passages is disposed between said two oil passages and in parallel thereto, said short-circuit valve projecting at an operating end thereof from the lateral side of the bottom wall of said lower half casing.

6. An axle driving apparatus according to claim 4, characterized in that an operating oil suction port communicating with the interior of a transmission casing is disposed between said two oil passages and a pair of check valves for supplying operating oil toward said two oil passages are disposed at two sides of said operating oil suction port.

7. An axle driving apparatus according to claim 6, characterized in that between said operating oil suction port and an opening communicating with the interior of said lower half casing is formed a space interposing therein an oil filter and open at the outer surface of the bottom wall of said lower half casing.

* * * * *